United States Patent

[11] 3,621,367

[72] Inventors Arye Rosen
Elkins Park, Pa.;
Edward Mykietyn, West Windsor
Township, Mercer County, N.J.
[21] Appl. No. 880,279
[22] Filed Nov. 26, 1969
[45] Patented Nov. 16, 1971
[73] Assignee RCA Corporation

[54] FREQUENCY MULTIPLIER EMPLOYING INPUT AND OUTPUT STRIP TRANSMISSION LINES WITHOUT SPATIALLY COUPLING THEREBETWEEN
6 Claims, 1 Drawing Fig.

[52] U.S. Cl. .......... 321/69 W, 333/73 S, 333/81 A
[51] Int. Cl. .......... H02m 5/20, H03h 7/02
[50] Field of Search .......... 321/69, 69 NL, 69 W; 333/24, 73, 81, 84, 84 M, 73 S, 81 A

[56] References Cited

UNITED STATES PATENTS

| | | | |
|---|---|---|---|
| 3,267,352 | 8/1966 | Blight .......... | 321/69 W |
| 3,343,069 | 9/1967 | Tsuda .......... | 321/69 W |

*Primary Examiner*—Gerald Goldberg
*Attorney*—Edward J. Norton

ABSTRACT: A frequency multiplier which features a varactor diode, two coupled transmission lines for input impedance transformation and two coupled transmission lines for output impedance transformation. An intermediate strip conductor is placed between the respective coupled transmission lines so as to provide nonspatially coupling between the lines.

PATENTED NOV 16 1971 3,621,367
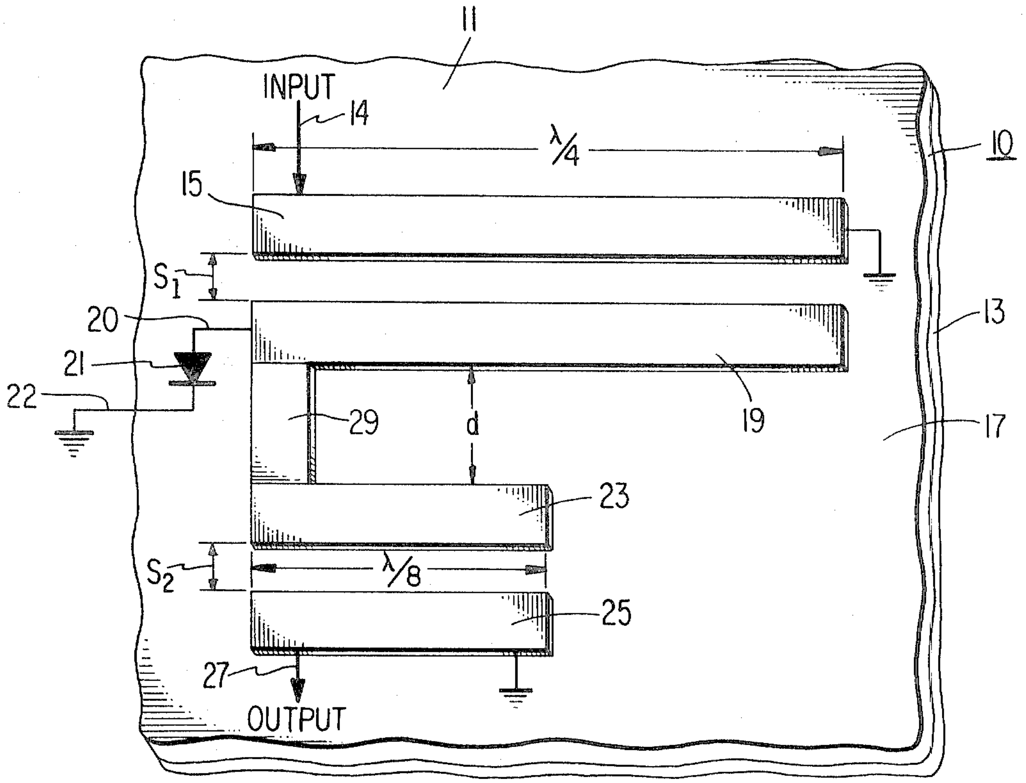
INVENTORS.
Arye Rosen and
Edward Mykietyn.
BY Robert L. Troike
ATTORNEY

FREQUENCY MULTIPLIER EMPLOYING INPUT AND OUTPUT STRIP TRANSMISSION LINES WITHOUT SPATIALLY COUPLING THEREBETWEEN

The invention herein described was made in the course of a contract or subcontract with the Dept. of the Air Force.

This invention relates to frequency multipliers using coupled transmission lines and variable reactance devices and more particularly to a frequency multiplier that includes input and output impedance-transformation means.

Because of the increased demand for components in the gigaHertz region, the need for less bulky components and for circuitry compatible with integrated circuit techniques, there is an increasing demand for frequency multipliers of the "strip transmission line" configuration. The term strip transmission line refers to that form of open nonconventional transmission line which includes a substrate of dielectric material with a narrow conductive strip and an adjacent substantially wider ground conductor disposed on the substrate. The strip transmission line may be in either (i) the asymmetrical configuration, called a "microstrip, " using a single ground plane on one side of the substrate and a narrow conductive strip on the opposite side of the substrate, (ii) the symmetrical configuration having two ground planes on opposite sides of a narrow conductive strip, each ground plane being spaced from the narrow strip by a dielectric layer, or (iii) a new surface strip transmission line configuration described by C. P. Wen in the IEEE 1969 G-MTT (Group on Microwave Theory and Techniques) International Microwave Symposium Digest, May 1969, under the title of "A Surface Strip Transmission Line for Nonreciprocal Gyromagnetic Device Applications." In the new surface strip transmission line configuration, the narrow conductor is spaced a short distance from the wider conductor and both are on the same surface of the dielectric substrate.

Frequency multipliers employing a variable reactance diode and a plurality of coupled strip transmission lines are well known. In a typical doubler configuration three narrow striplike conductors are closely spaced to each other on one surface of a dielectric substrate and a relatively wider ground planar conductor is on the opposite surface of that substrate. The first of these striplike conductors is a relatively narrow elongated conductor about one-quarter of a wavelength long at the fundamental frequency of the input signal to be multiplied. This first conductor is closely spaced parallel to the second similar elongated striplike conductor so as to form with the second conductor a coupled electromagnetic wave-supporting structure at the input or fundamental frequency. A varactor diode is coupled to one end of the second striplike conductor. The third elongated narrow striplike conductor is about one-half as long as the first and second or about one-eighth of a wavelength long at the fundamental frequency. This third conductor is closely spaced to the second conductor so as to form with the second conductor a second coupled electromagnetic wave-supporting structure at twice the input frequency. Impedance transformation of the input signal source to that of the varactor diode is provided by the proper selection of the widths of the first and second narrow conductors, the lengths of these conductors and the spacing between the conductors. Likewise, the output impedance transformation between the diode and the load is provided by arranging the widths of the second and third conductors, the length of these conductors, and the spacing between these conductors.

In the above-described arrangement and in the frequency multipliers heretofore known, these input and output impedance transformations are in the electromagnetic-coupling region of each other. As a consequence, relatively high-level signals at the input frequency and at the undesired harmonics of the input frequency appear in the output circuit. Also by the varying of the lengths or widths of one of the lines or the placement of the lumped components on one of the lines to provide improved impedance-matching in one of the impedance-matching transformations or to change the center operating frequency of the diode, the other impedance-matching transformation is upset because the other is in coupling relationship to the first. This difficulty leads to lower power generation efficiency at the desired multiple frequency over a relatively wide range of frequencies.

It is an object of the present invention to provide an improved frequency multiplier that exhibits greatly improved rejection of the input fundamental frequency and undesired harmonics of that fundamental frequency in the output circuit and has increased power generation efficiency over a relatively wide range of frequencies.

Briefly, this and other objects of the present invention are provided by a frequency multiplier including a plurality of transmission lines. A first of these lines includes a relatively narrow conductor closely spaced to a second transmission line including a second relatively narrow conductor. One of the ends of the first narrow conductor is coupled to a point of reference potential. The first and second relatively narrow conductors are closely spaced and arranged so as to provide a first coupled electromagnetic-wave-supporting structure at the input frequency of the multiplier. A variable reactance device is arranged so that one terminal of the device is coupled to one end of the second relatively narrow conductor and the opposite terminal is coupled to the point of reference potential. The variable reactance device is of the type and is so arranged so that in response to an electromagnetic wave at the input signal applied thereto, it provides an electromagnetic wave at a selected multiple of said input signal frequency. A third transmission line is provided that includes a third relatively narrow conductor connected to said one terminal of the variable reactance device and to said one end of said second narrow conductor. The third narrow conductor and the second narrow conductor are sufficiently spaced from each other so that each of said second and third narrow conductors is out of the closely coupled electromagnetic region of the other. A fourth transmission line is provided including a fourth relatively narrow conductor with one end of said narrow conductor coupled to a point of reference potential. The third and fourth narrow conductors are closely space to each other and arranged in a manner to provide a coupled electromagnetic wave supporting structure at said selected multiple of said input signal frequency.

A more detailed description follows in conjunction with the accompanying single illustration which is a schematic diagram of a frequency doubler according to the teaching of the present invention.

Referring to FIG. 1, there is shown a microstrip frequency doubler 10 including a dielectric substrate 11 and a ground conductor 13 covering one broad surface of the substrate 11. A first narrow conductive strip 15 is located at one end on the broad surface 17 of the substrate 11 opposite the ground conductor 13. A second narrow conductive strip 19 is closely spaced parallel and in coupling relation to the first conductive strip 15. The first narrow conductive strip 15 and the second narrow conductive strip 19 have a length equal to about one-quarter wavelength at the input or fundamental signal frequency. One end of first narrow conductive strip 15 is coupled to ground. This may be done by various means such as by a conductor extending from that one end over the edge of the substrate to the wider ground conductor 13 or by making a hole in the substrate 11 at that end and by passing a conductor through the substrate between conductor 15 and the wider ground conductor 13. The input signal at the input or fundamental frequency is applied across the narrow conductive strip 15 and ground conductor 13 at the other end of the conductive strip 15 as indicated by the arrow 14. A varactor diode 21 is connected to the strip 19 so that the anode terminal 20 is connected to the end of the narrow conductive strip 19 adjacent the input end of the narrow conductive strip 15. The cathode terminal 22 of the diode 21 is coupled to ground. This may be accomplished as described above by a conductor extending from the cathode terminal over the edge of the substrate 11 to the wider ground conductor 13 on the opposite side.

A third narrow conductive strip 23 is closely spaced parallel to a fourth conductive strip 25 so as to be in electromagnetic-wave-coupling relationship therewith. The third strip 23 and the fourth strip 25 each have a length equal to about one-eighth of a wavelength at the input or fundamental signal frequency. The third and fourth narrow conductive strips 23 and 25 are parallel to the first and second conductive strips, but the third and fourth conductive strips 23 and 25 are sufficiently separated from the first and second conductive strips so each is substantially removed from the electromagnetic-wave-coupling region of the first or second narrow conductive strips.

In the arrangement shown a transmission line section 29 on the order of 18 to 30 mils long, for example, connects the diode end of narrow conductive strip 19 to the adjacent end of the third narrow conductive strip 23. The frequency doubled output signal is coupled to the load across the narrow conductive strip 25 and the wider ground conductor 13 at the end indicated by the arrow 27. The opposite end of the narrow conductive strip 25 is coupled to the ground or reference potential. This may be done as discussed previously by passing a conductor at the end over the edge of the substrate 11 to the wider conductor 13 or through a hole in the substrate 11.

The input impedance match or impedance transformation between the source of the fundamental frequency and the impedance of the diode is provided by the coupled transmission lines comprising conductive strips 15 and 19 and wider ground conductor 13. This may be accomplished by adding lumped elements such as capacitors along the narrow conductive strips 15 or 19 or by simply altering slightly both the length and the width of the narrow conductive strips 15 and 19 and their spacing between each other. Due to the fact that the diode impedance at the input or fundamental frequency is essentially resistive, and the length of the narrow conductive strips 15 and 19 are equal and are made about one-quarter of a wavelength at the fundamental frequency, the impedance match between the input frequency source and the diode is provided by the width of the bars and the separation between the two narrow conductive strips 15 and 19 as described by E. Belohoubik and A. Rosen in May 1969 IEEE Transactions on Microwave Theory and Techniques, pp. 286 through 288. The output impedance match or output impedance transformation between the diode and the output load is similarly provided since the lengths of the narrow conductors are both equal to about one-quarter wavelength at the first harmonic frequency. In this case, due to the fact that the effect of the diode bond inductances and case capacitances at the second harmonic frequency are substantial, the diode exhibits an impedance having both resistive and reactive components. The length of the narrow conductive strips 23 and 25, the width of the conductive strips 23 and 25, the spacing between the conductive strips 23 and 25 and the length and characteristic impedance of the transmission line section 29 are arranged so as to, as nearly as possible, match both the resistive and reactive components of the impedance presented by the diode to the load.

In the operation of the circuit shown in Figure 1, the input signal at the fundamental frequency from an external source represented by the arrow 14 on the narrow strip 15 is coupled between one end of conductive strip 15 and wider conductor 13. The input signal is coupled from the strip 15 to the closely spaced narrow conductive strip 19. The coupled input signal along the narrow conductive strip 19 drives the varactor diode 21 so as to generate an RF (radio frequency) signal voltage having a component at the second harmonic of the input frequency. The width and length of the narrow conductive strips 23 and 25 and the characteristic impedance of the transmission line 29 act as a band pass filter to transmit signals at the second harmonic frequency but reject the fundamental frequency and the harmonics of the fundamental frequency above the second. The combination of the width and the length of the narrow conductors 15 and 19 acts as a band reject filter to prevent the second harmonic leakage back to the input.

By separating the input and output transformation sections in the manner described above so one is out of the coupling region of the other, the input and output electromagnetic-coupling structures can separately match the diode impedance to the source or the load and be optimally tuned to provide isolation of undesired input or fundamental frequency and the undesired harmonics of the fundamental frequency from the output circuit. Also, as a result of the separate, and consequently more optimum impedance matching, a structure is provided which exhibits greater bandwidth capability than those multipliers previously known.

Tests on the doubler described below, with 10 watts input power, showed a peak second harmonic-power-generation efficiency of 58 percent across a 1 db. bandwidth of 20 percent in the frequency range of 1,320 $GH^z$. to 1,620 $GH^z$.

Strip conductors 15 and 19=700 mils long, 90 mils wide,
Spacing between conductors 15 and 19 ($s_1$)=3 mils,
Strip conductors 23 and 25=200 mils long and 45 mils wide,
Spacing between conductors 23 and 25 ($s_2$)=3 mils, and
Spacing between conductors 19 and 23 (length of line 29 or $d$)=20 mils.

Even better performance may be achieved if the length of the line 29 is further increased beyond 20 mils. The length of transmission line or $d$ section 29, was in the above arrangement equal to 20 mils and the width was 50 mils.

The impedance at input and output arrows was 50 ohms and the diode was a bimode varactor diode VAB 812–AS sold by Varian of Palo Alto, Cal. The impedance of this diode at the fundamental frequency was about 7 ohms and the impedance of the diode at the second harmonic frequency was about 7+$j$ 10 ohms. The dielectric constant of the substrate was equal to about 10, and the conductive strips comprised a copper layer having a thickness on the order of 1 mil.

As discussed above, element 19 (second conductor), element 23 (third conductor) and element 29 (line) are all connected to each other. The intermediate conductor element 29 is coupled near the end of conductor 19 and near the end of conductor 23. Since these elements are connected to each other, they are electrically one conductor having three portions; the first portion being element 19, the second portion being element 23 and the third or intermediate portion being element 29. Therefore, the multiplier is made up of three electrical conductors, the first electrical conductor being element 15, the second electrical conductor being the combined elements 19, 29 and 23 and the third electrical conductor being element 25.

What is claimed is:

1. Apparatus for multiplying the frequency of an input signal comprising:

a first transmission line including a first relatively narrow conductor of a given length with one end of said narrow conductor coupled to a point of reference potential, a second transmission line including a second relatively narrow and longer conductor, said second conductor having a first portion, a second portion, and an intermediate portion with said intermediate portion joining said first and second portions near the ends thereof, said first portion being of said given length and being closely spaced and parallel to said first relatively narrow conductor and arranged in a manner to provide with said first narrow conductor a first closely spaced parallel coupled electromagnetic-wave-supporting structure at said input signal frequency, a variable reactance device having two terminals, one terminal of which is coupled to said second narrow conductor of said second transmission line near the junction of said first portion and said intermediate portion and the other terminal of which is coupled to a point of reference potential and responsive to said electromagnetic wave at said input signal frequency to produce an electromagnetic wave at the selected multiple of said input signal frequency, and a third transmission line including a third relatively narrow conductor with one end of said third narrow conductor being coupled to a point of reference potential, said second portion of said second conductor of said second transmission line and said third narrow conductor being of equal length and closely spaced and parallel to each other so that they are arranged in a manner to provide a second closely spaced parallel coupled electromagnetic-wave-supporting structure at said selected multiple of said input signal frequency, said first and second portions being sufficiently separated so that said first portion, said second portion and said intermediate portion are arranged to prevent said second parallel-coupled structure from being coupled to said first parallel-coupled structure, except for said intermediate portion.

2. Apparatus for multiplying the frequency of an input signal, comprising:

at least one substrate of dielectric material having a relatively wide planar ground conductor on one surface of said substrate, a first relatively narrow elongated conductive strip fixed to a surface of said substrate opposite said one surface, with one end of said conductor coupled to a point of reference potential, a second relatively narrow elongated conductive strip closely spaced and parallel to said first narrow conductive strip on said opposite surface of said substrate to provide in conjunction with said ground planar conductor a first closely spaced parallel coupled electromagnetic-wave-supporting structure at said input signal frequency, a variable reactance device having two terminals, one terminal of which is coupled to one end of said second narrow conductive strip and the other terminal of which is coupled to a point of reference potential and being responsive to said transverse electromagnetic wave at said input signal frequency to produce a transverse electromagnetic wave at a selected multiple of said input signal frequency, a third relatively narrow elongated conductive strip on said opposite surface of said substrate, a fourth conductive strip on said opposite surface joining the ends of said second and third conductive strips, a fifth relatively narrow elongated conductive strip closely spaced and parallel to said third narrow conductive strip on said opposite surface of said substrate to provide, in conjunction with the planar ground conductor, a second closely spaced parallel-coupled transverse electromagnetic-mode-supporting structure at a selected multiple of said input signal frequency, said second and third narrow conductive strips being sufficiently separated so that said second, third and fourth conductive strips are arranged to prevent said second parallel coupled structure from being coupled to said first parallel coupled structure except for said fourth conductor.

3. The combination as claimed in claim 2 wherein the spacing between said second and third narrow conductive strips is greater than 18 mils.

4. The combination as claimed in claim 2 wherein said variable reactance device is a varactor diode.

5. The combination as claimed in claim 4 wherein said diode is a bimode varactor diode and wherein said selected multiple of said input frequency is twice said input frequency.

6. The combination as claimed in claim 4, wherein said first and second narrow conductive strips are each about one-quarter-wavelength long at said fundamental frequency and said third and fifth narrow conductive strips are each about one-eighth-wavelength long at said fundamental frequency.

* * * * *